(12) United States Patent
Tanioka et al.

(10) Patent No.: US 7,919,141 B2
(45) Date of Patent: Apr. 5, 2011

(54) PROCESSES AND EQUIPMENTS FOR PREPARING F2-CONTAINING GASES, AS WELL AS PROCESS AND EQUIPMENTS FOR MODIFYING THE SURFACES OF ARTICLES

(75) Inventors: Takashi Tanioka, Shibukawa (JP);
Katsuya Fukae, Shibukawa (JP);
Taisuke Yonemura, Chiyoda-ku (JP)

(73) Assignee: Kanto Denka Kogyo Co., Ltd., Tokyo (JP)

( * ) Notice: Subject to any disclaimer, the term of this patent is extended or adjusted under 35 U.S.C. 154(b) by 1302 days.

(21) Appl. No.: 10/585,878

(22) PCT Filed: Mar. 30, 2005

(86) PCT No.: PCT/JP2005/006149
§ 371 (c)(1),
(2), (4) Date: Jul. 11, 2006

(87) PCT Pub. No.: WO2005/095268
PCT Pub. Date: Oct. 13, 2005

(65) Prior Publication Data
US 2009/0047792 A1    Feb. 19, 2009

(30) Foreign Application Priority Data

Mar. 31, 2004 (JP) ................. 2004-103364

(51) Int. Cl.
*C23C 16/00* (2006.01)
*H05H 1/24* (2006.01)
*C01B 7/00* (2006.01)
(52) U.S. Cl. ............... 427/248.1; 427/569; 423/500
(58) Field of Classification Search ............ 427/248.1, 427/569; 423/500
See application file for complete search history.

(56) References Cited

U.S. PATENT DOCUMENTS 4,213,102 A * 7/1980 Warren, Jr. et al. ............ 372/89
5,492,736 A * 2/1996 Laxman et al. ................ 427/579
(Continued)

FOREIGN PATENT DOCUMENTS
EP      1 542 264 A1    6/2005
(Continued)

OTHER PUBLICATIONS

Supplementary European Search Report issued by European Patent Office in EP 05 72 9764 dated May 4, 2009.

*Primary Examiner* — Timothy H Meeks
*Assistant Examiner* — Kelly M Gambetta
(74) *Attorney, Agent, or Firm* — Browdy and Neimark, PLLC

(57) ABSTRACT

The present invention provides processes and equipments for safely and easily preparing an $F_2$-containing gas, as well as processes and equipments for surface modification using the $F_2$-containing gas prepared.
According to the present invention, a gas containing a fluoro compound that is easier to handle than $F_2$ is supplied and the fluoro compound is excited and decomposed to convert it into $F_2$ gas before surface modification and then used for surface modification. According to the present invention, there is no necessity of providing, storing and transporting a large amount of $F_2$ gas in advance because a necessary amount of $F_2$ gas is obtained immediately before surface modification. A process for preparing an $F_2$-containing gas comprises the steps of exciting at least one fluoro compound in a fluoro compound-containing gas by conferring energy on the fluoro compound-containing gas under reduced pressure; and partially or completely converting the excited fluoro compound-containing gas containing the excited fluoro compound into $F_2$ under normal pressure or overpressure.

26 Claims, 1 Drawing Sheet

U.S. PATENT DOCUMENTS

| | | |
|---|---|---|
| 2004/0109817 A1* | 6/2004 | Smith et al. .................. 423/500 |
| 2004/0151656 A1* | 8/2004 | Siegele et al. ............... 423/500 |
| 2005/0252451 A1 | 11/2005 | Beppu et al. |

FOREIGN PATENT DOCUMENTS

| | | | |
|---|---|---|---|
| JP | 8217897 | | 8/1996 |
| JP | 9205272 | | 8/1997 |
| JP | 2000-319433 | | 11/2000 |
| JP | 2000319433 | * | 11/2000 |
| JP | 2001-240956 | | 9/2001 |
| JP | 2002-064097 | | 2/2002 |
| JP | 2003-128820 | | 5/2003 |
| JP | 2004/39740 | | 2/2004 |

* cited by examiner

PROCESSES AND EQUIPMENTS FOR PREPARING F2-CONTAINING GASES, AS WELL AS PROCESS AND EQUIPMENTS FOR MODIFYING THE SURFACES OF ARTICLES

TECHNICAL FIELD

The present invention relates to processes and equipments for preparing $F_2$-containing gases by exciting a fluoro compound under reduced pressure to generate an active species, and then raising the pressure to a normal pressure or overpressure condition to substantially wholly deactivate the generated active species, thereby generating fluorine ($F_2$), as well as processes and equipments for modifying the surfaces of articles by contacting the $F_2$-containing gas with the surfaces.

BACKGROUND ART

Plasma CVD is widely used to form thin films in the manufacture of semiconductor devices. In plasma CVD, a gaseous fluoro compound such as $NF_3$ is ionized, and the resulting ionized species are used for etching the surfaces of semiconductor substrates or cleaning CVD chambers. During such plasma ionization, $F_2$ gas is also generated, but $F_2$ gas is treated as exhaust gas.

For example, a method has been known for ionizing $F_2$ gas and using the resulting ionized species to clean the inner wall of a CVD chamber (e.g., see patent document 1), but this method uses a plasma of $F_2$ gas rather than $F_2$ gas itself.

Surface treatment methods for materials other than semiconductors such as metal materials and plastic materials using a plasma derived from a fluoro compound have been reported (see patent document 2, and patent document 4). However, the plasma may penetrate into the article to be surface-treated to damage the article in these methods.

A surface treatment method using unionized $F_2$ gas has also been reported (e.g., see patent document 3). However, the method directly using $F_2$ gas has the following problems. First, it is difficult to store, transport and use a large amount of $F_2$ gas because of the toxicity, hazardousness, reactivity, and corrosiveness of $F_2$ gas. In order to reduce hazardousness, diluted $F_2$ gas can be used, but costs for storage and transportation increase. Moreover, very stable materials must be used for the sites exposed to $F_2$ gas, which add costs of the surface treatment equipment.

A method for treating the surface of an article comprising exciting a halogen compound by applying a low-frequency voltage on it at or near atmospheric pressure to decompose it and generate a halogen or hydrogen halide has also been proposed (see patent document 5). This method has the advantage that it is simple and safe to operate because it can be performed at or near atmospheric pressure. However, the concentration of the halogen or hydrogen halide that can be generated by this method is considerably low because of low decomposition efficiency and it is not easy to secure a sufficient concentration or amount for the subsequent use.

REFERENCES

Patent document 1: JP 2004-039740 A
Patent document 2: JP 2000-319433 A
Patent document 3: JP 2001-240956 A
Patent document 4: JP 08-217897 A
Patent document 5: JP 09-205272 A

DISCLOSURE OF THE INVENTION

Problems to be Solved by the Invention

The present invention was made under the circumstances as described above and provides processes for safely and easily preparing $F_2$ gas in simple equipments and such equipments. The present invention also provides processes and equipments enabling safe and easy surface modification by $F_2$ gas.

Means for Solving the Problems

As a result of careful studies to solve these problems, we accomplished the present invention on the basis of the finding that surface modification by $F_2$ gas can be safely and easily performed by supplying a gas containing a fluoro compound (a fluorine-containing compound) that is easier to handle than $F_2$ gas and converting the fluoro compound into $F_2$ gas before surface modification. We also accomplished the present invention on the basis of the finding that $F_2$ gas can be efficiently generated in a sufficient concentration and amount from a fluoro compound by exciting the fluoro compound under reduced pressure to generate an active species and then raising the pressure to a normal pressure or overpressure condition to substantially wholly deactivate the active species generated.

Accordingly, the present invention provides the following.

(1) A process for preparing an $F_2$-containing gas comprising the steps of:

exciting at least one fluoro compound in a fluoro compound-containing gas by conferring energy on the fluoro compound-containing gas under reduced pressure; and partially or completely converting the excited fluoro compound-containing gas containing the excited fluoro compound into $F_2$ under normal pressure or overpressure.

(2) The process for preparing an $F_2$-containing gas as defined in (1) wherein the step of exciting a fluoro compound is performed in a first zone maintained under reduced pressure; and the step of converting the gas into $F_2$ is performed in a second zone communicating with the first zone and maintained under normal pressure or overpressure.

(3) The process for preparing an $F_2$-containing gas as defined in (1) wherein the step of exciting a fluoro compound is performed in a first zone maintained under reduced pressure; and the step of converting the gas into $F_2$ comprises maintaining the pressure in the transportation system under a normal pressure or overpressure condition during transportation of the excited fluoro compound-containing gas to a second zone communicating with the first zone.

(4) The process for preparing an $F_2$-containing gas as defined in (1) wherein the step of exciting a fluoro compound is performed in a first zone maintained under reduced pressure; and the step of converting the gas into $F_2$ is performed by maintaining the pressure in the first zone under a normal pressure or overpressure condition.

(5) The process for preparing an $F_2$-containing gas as defined in (1) wherein the step of exciting a fluoro compound is performed in a first chamber maintained under reduced pressure; and the step of converting the gas into $F_2$ comprises transporting the excited fluoro compound-containing gas containing the excited fluoro compound from the first chamber to a second chamber maintained under normal pressure or overpressure via a gas channel connecting the first chamber and the second chamber.

(6) The process for preparing an $F_2$-containing gas as defined in (1) wherein the step of exciting a fluoro compound is performed in a first chamber maintained under reduced pressure; and the step of converting the gas into $F_2$ comprises maintaining the pressure in the transportation system under a normal pressure or overpressure condition during transportation of the excited fluoro compound-containing gas containing the excited fluoro compound from the first chamber to a second chamber via a gas channel connecting the first chamber and the second chamber.

(7) The process for preparing an $F_2$-containing gas as defined in (1) wherein the step of exciting a fluoro compound is performed in a first chamber maintained under reduced pressure; and the step of converting the gas into $F_2$ is performed in the first chamber by maintaining the first chamber under normal pressure or overpressure.

(8) The process for preparing an $F_2$-containing gas as defined in (5) or (6) wherein a vacuum pump is provided in a gas channel connecting the first chamber and the second chamber and said vacuum pump is used during the step of transporting the excited fluoro compound-containing gas from the first chamber to the second chamber.

(9) The process for preparing an $F_2$-containing gas as defined in any one of (1) to (8) wherein the step of exciting a fluoro compound comprises ionizing the fluoro compound-containing gas.

(10) The process for preparing an $F_2$-containing gas as defined in any one of (1) to (9) wherein the fluoro compound is a gaseous fluoro compound selected from linear, branched or cyclic saturated perfluorocarbons, linear, branched or cyclic unsaturated perfluorocarbons, carbonyl fluorides, perfluoro hypofluorides, perfluoro peroxides, perfluoroether compounds, oxygen-containing fluorides, interhalogen fluorides, iodine-containing fluorides, sulfur-containing fluorides, nitrogen-containing fluorides, silicon-containing fluorides, rare gas-containing fluorides, or combinations thereof.

(11) The process for preparing an $F_2$-containing gas as defined in any one of (1) to (9) wherein the fluoro compound is selected from $CF_4$, $C_2F_6$, $C_3F_8$, $C_4F_{10}$, $C_5F_{12}$, $C_6F_{14}$, $C_2F_4$, $C_3F_6$, $C_4F_8$, $C_5F_{10}$, $C_6F_{12}$, $C_4F_6$, FCOF, $CF_3COF$, $CF_2(COF)_2$, $C_3F_7COF$, $CF_3OF$, $C_2F_5OF$, $CF_2(OF)_2$, $CF_3COOF$, $CF_3OOCF_3$, $CF_3COOOF$, $CF_3OCF_3$, $C_2F_5OC_2F_5$, $C_2F_4OC_2F_4$, $OF_2$, $SOF_2$, $SOF_4$, NOF, $ClF_3$, $IF_5$, $BrF_5$, $BrF_3$, $CF_3I$, $C_2F_5I$, $N_2F_4$, $NF_3$, $NOF_3$, $SiF_4$, $Si_2F_6$, $XeF_2$, $XeF_4$, $KrF_2$, $SF_4$, $SF_6$, or a mixture thereof.

(12) The process for preparing an $F_2$-containing gas as defined in any one of (1) to (11) wherein the fluoro compound-containing gas comprises an inert gas and/or oxygen.

(13) The process for preparing an $F_2$-containing gas as defined in (12) wherein the inert gas is He, Ne, Ar, Xe, Kr, $N_2$, or a combination thereof.

(14) The process for preparing an $F_2$-containing gas as defined in any one of (1) to (13) wherein the fluoro compound is one or more members selected from the group consisting of $NF_3$, $C_2F_6$, and $COF_2$.

(15) The process for preparing an $F_2$-containing gas as defined in (14) wherein the fluoro compound is ionized in the presence of oxygen when it is a perfluorocarbon or a mixture containing one or more perfluorocarbons.

(16) A process for modifying the surface of an article comprising contacting an $F_2$-containing gas obtained by the process for preparing an $F_2$-containing gas as defined in any one of (1) to (15) with the surface of the article under reduced pressure or overpressure or normal pressure.

(17) The surface modification process as defined in (16) further comprising the step of introducing an inert gas and/or oxygen after conferring energy on the fluoro compound-containing gas before contacting the gas with the article to be surface-modified.

(18) The surface modification process as defined in (16) or (17) wherein the surface modification is performed by fluorinating the surface of the article.

(19) The surface modification process as defined in any one of (16) to (18) wherein the article to be surface-modified is one or more members selected from the group consisting of metals, metal compounds and polymers.

(20) The surface modification process as defined in (19) wherein the polymer is an article based on polypropylene.

(21) The surface modification process as defined in (19) wherein the metal compound is one or more members selected from the group consisting of metal oxides, metal nitrides, metal carbides, metal hydroxides and metal chlorides.

(22) The surface modification process as defined in (19) wherein the metal compound is a compound based on Si.

(23) The surface modification process as defined in (22) wherein the compound based on Si is Si, $SiO_2$, $Si_3N_4$, SiC, polysilicon, amorphous silicon, or a combination thereof.

(24) The surface modification process as defined in (22) wherein the compound based on Si is deposited in an LPCVD equipment.

(25) An equipment for preparing an $F_2$-containing gas comprising:

a means for ionizing a fluoro compound-containing gas under reduced pressure; and a pressure controlling means communicating with the ionizing means and controlling the pressure of the ionized fluoro compound-containing gas at a normal pressure or overpressure condition.

(26) A surface modification equipment comprising a means communicating with the pressure controlling means in the equipment for preparing an $F_2$-containing gas as defined in (25) and positioning an article whose surface should be contacted with the $F_2$-containing gas prepared in the equipment for preparing an $F_2$-containing gas under reduced pressure or overpressure or normal pressure.

(27) The surface modification equipment as defined in (26) further comprising a vacuum pump or compressor communicating with the means for positioning the article.

(28) A method for using the equipment as defined in any one of (25) to (27) to directly fluorinate an organic and/or inorganic material.

ADVANTAGES OF THE INVENTION

According to the present invention, $F_2$ gas can be prepared from a fluoro compound and used in an amount necessary for each application, especially for surface modification of a material or synthetic reaction using $F_2$ gas, thereby eliminating the necessity of providing/storing a large amount of hard-to-handle $F_2$ gas in advance.

THE MOST PREFERRED EMBODIMENTS OF THE INVENTION

Figure 1:
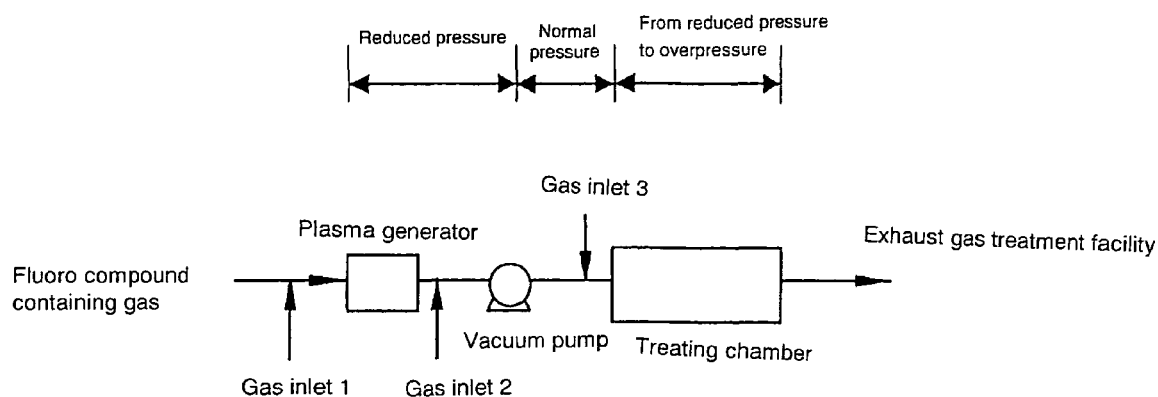
FIG. 1 shows an example of a surface modification equipment of the present invention.

In the present invention, the first zone for conferring energy on a fluoro compound-containing gas and the second zone for modifying the surface of an article may be provided in the same chamber. As used herein, the first zone refers to a space in which energy is conferred on a fluoro compound-containing gas by an energy conferring means, and the second zone refers to a space in which an article to be surface-modified is placed. The first zone and the second zone are in gaseous communication, and the fluoro compound-containing gas flows in gas phase from the first zone to the second zone. The first and second zones may be placed at different locations in the same chamber. For example, when the energy conferring means and the means for mounting an article to be surface-modified are placed at different locations, the space containing the former is the first zone and the space containing the latter is the second zone.

The first zone and the second zone may be different chambers. In this case, the first zone and the second zone form a first chamber and a second chamber, respectively. The first chamber and the second chamber are brought into gaseous communication by any known method. For example, the first chamber and the second chamber are connected via a gas channel so that the fluoro compound-containing gas flows from the first zone to the second zone via the gas channel.

A partition wall may be provided between the first zone and the second zone while keeping communication therebetween. In this case, the pressure in the first and second zones can be independently varied by operatively evacuating the first zone and/or second zone. When the first zone is under reduced pressure and the second zone is at a pressure higher than that of the first zone, the excited fluoro compound can be partially or completely converted into $F_2$ by raising the pressure. However, conversion into $F_2$ is not limited to such an embodiment, but may also be performed in the first zone or during transportation from the first zone to the second zone.

In the present invention, the fluoro compound in the fluoro compound-containing gas supplied to the first zone is not specifically limited, but any compound can be used so far as it is excited by conferring energy and decomposed and then produces $F_2$ gas and it is easier to handle than $F_2$ gas. In terms of ease of handling, fluoro compounds that are gaseous in use conditions are preferred. For example, compounds that are gaseous at 25° C., 1 atm are preferred.

Fluoro compounds include linear, branched or cyclic saturated perfluorocarbons; linear, branched or cyclic unsaturated perfluorocarbons, carbonyl fluorides, perfluoro hypofluorides, perfluoro peroxides, perfluoroether compounds, oxygen-containing fluorides, interhalogen fluorides, iodine-containing fluorides, sulfur-containing fluorides, nitrogen-containing fluorides, silicon-containing fluorides, rare gas-containing fluorides, or combinations thereof.

As used herein, the perfluorocarbon refers to a hydrocarbon in which all the H atoms have been replaced by F atoms. As used herein, substituted or unsubstituted hydrocarbon groups without prefix or without distinction between structural isomers include all isomers unless otherwise indicated. For example, $C_4F_{10}$ includes n-$C_4F_{10}$ and i-$C_4F_{10}$. The cyclic compounds may be monocyclic compounds or polycyclic compounds, alicyclic compounds or aromatic compounds, or carbocyclic compounds or heterocyclic compounds.

The saturated perfluorocarbon refers to a perfluorocarbon having no carbon-carbon multiple bonds.

The number of carbon atoms in the saturated perfluorocarbon is not specifically limited, but preferably 1-8, more preferably 1-6. Linear saturated perfluorocarbons include $CF_4$, $C_2F_6$, $C_3F_8$, n-$C_4F_{10}$, n-$C_5F_{12}$, and n-$C_6F_{14}$; branched saturated perfluorocarbons include i-$C_4F_{10}$, i-$C_5F_{12}$, $C(CF_3)_4$, i-$C_6F_{14}$, $C_3F_7CF(CF_3)_2$; and cyclic perfluorocarbons include $C_6F_{12}$.

The unsaturated perfluorocarbon refers to a perfluorocarbon having at least one carbon-carbon double bond and/or triple bond. The number of carbon atoms in the unsaturated perfluorocarbon is not specifically limited, but preferably 2-8, more preferably 2-6. For example, unsaturated perfluorocarbons include $C_2F_4$, $C_3F_6$, $CF(CF_3)\!=\!CF(CF_3)$, $CF_2\!=\!C(C_2F_5)F$, $CF_2\!=\!C(CF_3)_2$, c-$C_4F_8$, $CF\!\equiv\!CC_2F_5$, $CF_3C\!\equiv\!CCF_3$, $C_5F_{10}$, $C_6F_{12}$, $C_2F_2$, $C_3F_4$, $C_4F_6$.

The carbonyl fluoride refers to a compound containing a carbonyl group and fluorine. Carbonyl fluorides include FCOF, $CF_3COF$, $CF_2(COF)_2$, and $C_3F_7COF$.

The perfluoro peroxide refers to a peroxide in which all the H atoms have been replaced by F atoms, such as $CF_3OOCF_3$.

The perfluoroether compound refers to an ether in which all the H atoms have been replaced by F atoms, such as $CF_3OCF_3$, $C_2F_5OC_2F_5$, and $C_2F_4OC_2F_4$.

The perfluoro hypofluoride refers to a compound having a structure obtained by replacing all the —OH groups of a compound having at least one —OH group by —OF groups and replacing all the H atoms other than —OH groups by F atoms. Perfluoro hypofluorides include $CF_3OF$, $C_2F_5OF$, $CF_2(OF)_2$, and $CF_3COOF$.

Oxygen-containing fluorides include $OF_2$, $SOF_2$, $SOF_4$, NOF and $NOF_3$ in addition to the carbonyl fluorides, perfluoro peroxides and perfluoroether compounds described above.

The interhalogen fluoride refers to a compound in which a bond has been formed between a halogen other than fluorine and fluorine. Interhalogen fluorides include $ClF_3$, $IF_5$, $BrF_5$, and $BrF_3$.

The iodine-containing fluoride refers to a compound containing iodine and fluorine, such as $CF_3I$, and $C_2F_5I$.

The nitrogen-containing fluoride refers to a compound containing nitrogen and fluorine, such as $N_2F_4$, $NF_3$, NOF, $NOF_3$.

The silicon-containing fluoride refers to a compound containing silicon and fluorine, such as $SiF_4$, $Si_2F_6$.

The rare gas-containing fluoride refers to a compound containing a rare gas and fluorine, such as $XeF_2$, $XeF_4$, and $KrF_2$.

The sulfur-containing fluoride refers to a compound containing sulfur and fluorine, such as $SF_4$, $SF_6$, $SOF_2$, and $SOF_4$.

These fluoro compounds may be used alone or in combination.

The fluoro compound-containing gas supplied to the first zone may contain a gas other than the fluoro compound. The type and flow rate of the gas other than the fluoro compound and the pressure in the first zone is selected depending on the mode of exciting the fluoro compound in the first zone and the intended concentration of $F_2$ generated. When a plasma is generated in the first zone, an inert gas and/or oxygen can be used as the gas other than the fluoro compound. Inert gases include He, Ne, Ar, Xe, Kr, $N_2$, or a combination thereof. When the fluoro compound is a nitrogen-containing fluoro compound, Ar is preferred, and when the fluoro compound is a perfluorocarbon, $O_2$ is preferred.

Methods for exciting the fluoro compound by conferring energy in the first zone are not specifically limited so far as $F_2$ is generated after excitation, e.g., plasma ionization, irradiation, and heating. Excitation refers to transition to an energy state higher than the ground state. For plasma ionization, any known method can be used, such as inductively coupled plasma (ICP), helicon wave plasma, and electron cyclotron resonance plasma (ECR). Irradiations include UV irradiation and laser irradiation. If the fluoro compound is thermally decomposed to generate $F_2$, heating can be used as energy conferring means.

The gas containing the fluoro compound excited in the first zone generates $F_2$ before it is contacted with an article to be surface-modified in the second zone. $F_2$ can be generated at any site and any time, i.e., it can be generated in the first zone, or during transportation from the first zone to the second zone, or in the second zone. When the first zone and second zone are different chambers, $F_2$ can be generated in a gas channel connecting both. $F_2$ can be generated by any reaction mechanism, including recombination of the F radicals generated by excitation, for example.

When the fluoro compound-containing gas contains two or more fluoro compounds, $F_2$ can be generated from all species of fluoro compounds or a part of species of fluoro compounds can contribute to $F_2$ generation. The proportion of fluoro compounds converted into $F_2$ is preferably higher, and the total amounts of fluoro compounds may be converted into $F_2$. The gas containing the fluoro compound when it is supplied to the first zone is herein referred to as "fluoro compound-containing gas". The gas containing the fluoro compound excited in the first zone is referred to as "excited fluoro compound-containing gas". The "excited fluoro compound-containing gas" may sometimes contain $F_2$ derived from the excited fluoro compound.

The fluoro compound-containing gas treated in the first zone is transported to the second zone. The fluoro compound-containing gas treated in the first zone may generate $F_2$ gas in the first zone or may generate $F_2$ gas as time goes by. The generation of $F_2$ gas can be promoted by increasing the total pressure of the fluoro compound-containing gas and/or the partial pressure of the excited fluoro compound. Thus, when the first chamber and the second chamber communicate via a gas channel, the fluoro compound-containing gas can be transported to the second chamber without removing it outside.

Processes of the present invention offer the advantage that there is no necessity of providing or transporting or otherwise handling a large amount of $F_2$ gas in advance because $F_2$ gas in an amount necessary for surface modification is prepared in a first zone by exciting a fluoro compound and consumed in a second zone. In other words, the conventional problems with handling of $F_2$ gas can be solved by storing $F_2$ gas in the form of a fluoro compound that is safer and easier to handle than $F_2$ gas before surface modification and converting the fluoro compound into $F_2$ gas to use it for surface modification.

After the fluoro compound is excited and before it is contacted with an article to be surface-modified, the fluoro compound may be mixed with another gas. The additional gas to be mixed is preferably an inert gas. The inert gas here has the meaning as defined above. The additional gas can be introduced anywhere in the first zone and second zone. When the first zone and the second zone are different chambers, the additional gas can be introduced anywhere in the first chamber, in the second chamber, and in the gas channel connecting the first chamber and the second chamber.

At the point when the excited fluoro compound-containing gas is removed from the first zone, it may contain $F_2$. In view of the hazardousness and reactivity of $F_2$ gas, the $F_2$ gas concentration of the $F_2$-containing gas is preferably low.

To remove the fluoro compound-containing gas from the first chamber, the first chamber may be evacuated via a vacuum pump and the discharged fluoro compound-containing gas may be introduced into the second chamber. The vacuum pump can be provided in a gas channel connecting the first chamber and the second chamber. When a vacuum pump is used, the fluoro compound may be mixed with another gas between the first chamber and the vacuum pump or between the vacuum pump and the second chamber.

The flow rate of the additional gas to be mixed after removal from the first zone and the pressure in the second zone are selected depending on the material and surface area of the article to be surface-modified.

The article to be surface-modified is not specifically limited and may be made from any material so far as it reacts with $F_2$ gas upon contact with it. Preferably, the surface is fluorinated by contacting the surface with $F_2$ gas. Various properties such as water repellency, oil repellency, soil resistance and weather resistance can be improved by surface fluorination. In view of the reaction with $F_2$ gas, the article to be surface-modified preferably comprises a metal and/or metal compound and/or polymer, more preferably comprises a metal and/or metal compound and/or polymer on the surface.

Metals include, for example, elemental metals such as iron, aluminum, titanium, zinc, nickel, tin and copper; and alloys such as stainless steel and brass. Metal compounds include one or more members selected from the group consisting of metal oxides, metal nitrides, metal carbides, metal hydroxides and metal chlorides, e.g., a compound based on Si, i.e., Si, $SiO_2$, $Si_3N_4$, SiC, polysilicon, amorphous silicon, or a combination thereof. The compound based on Si may be deposited in an LPCVD equipment. Polymers include polyethylenes such as HDPE, LDPE, LLDPE; polypropylene; polyesters such as polyethylene terephthalate and polyethylene naphthalate; polyvinyl chloride, polyvinylidene chloride, nylon, polyvinyl acetate, polyvinyl alcohol, polyvinyl acetal, polystyrene, etc.

The present invention also relates to a surface modification equipment comprising a first zone and a second zone, as well as a surface modification equipment comprising a first chamber, a second chamber, and a gas channel connecting the first chamber and the second chamber.

The first zone includes an energy conferring means, which confers energy on a fluoro compound-containing gas, thereby exciting at least one fluoro compound in the fluoro compound-containing gas. The energy conferring means include plasma generators, light sources, and heat sources. Plasma generators include ECR plasma generators, ICP plasma generators, and helical plasma generators. Light sources include xenon lamps, excimer lasers, etc. Heat sources include electric furnaces.

After the fluoro compound is excited in the first zone, the excited fluoro compound-containing gas is transported to the second zone. When the first and second zone are different chambers, the excited fluoro compound-containing gas flows via a gas channel connecting the first chamber and second chamber. The surface modification equipment of the present invention may further comprise a vacuum pump in the gas channel.

The surface modification equipment of the present invention may further comprise a means for mixing the excited fluoro compound-containing gas and an inert gas. The means for mixing the excited fluoro compound-containing gas and an inert gas is not specifically limited, and the equipment may be simply designed so that the excited fluoro compound-containing gas channel and the inert gas channel join.

The second zone can include a means for introducing an article to be surface-modified. The introducing means is not specifically limited, and a movable stage may be introduced via a sample introducing chamber. The gas discharged from the second zone is sent to an exhaust gas treatment facility because $F_2$ or a fluoro compound may remain in it.

An embodiment of the present invention for exciting a fluoro compound-containing gas by plasma ionization is explained below with reference to FIG. 1.

In the surface modification equipment of FIG. 1, the first chamber includes a plasma generator, which is evacuated to a pressure suitable for plasma generation, preferably 1-1333 Pa. After evacuation, a fluoro compound capable of generating $F_2$ gas by plasma ionization such as an $NF_3$-containing gas is supplied to the first chamber. The fluoro compound may be mixed with another gas such as $N_2$ or Ar before it is supplied to the first chamber. In this case, a gas containing the fluoro compound and the additional gas is supplied to the first chamber as a fluoro compound-containing gas. In other words, the supplied fluoro compound-containing gas may be $NF_3$ alone or a mixed gas of $NF_3$ and $N_2$.

If $NF_3$ is completely converted into $F_2$ as shown below:

$$NF_3 \rightarrow \tfrac{1}{2}N_2 + 3/2F_2$$

when the fluoro compound-containing gas is $NF_3$ alone, 25% nitrogen gas is generated and therefore, the concentration of the $F_2$ gas generated is 75% at maximum. One of preferred features of the present invention is that substantially complete decomposition of $NF_3$ can be achieved.

As the amount of $NF_3$ that can be introduced is 100 sccm-5000 sccm, the amount of $F_2$ gas generated is 150 sccm-7500 sccm. An inert gas is introduced upstream of the treating chamber if one wishes to use the $F_2$ gas at a more dilute concentration than 75%, or it is introduced upstream of the vacuum pump if one wishes to handle the $F_2$ gas at a concentration as low as possible. Alternatively, an inert gas is introduced upstream of the plasma generator and controlled to a desired concentration provided that the conditions for generating a plasma are satisfied. This dilute fluorine gas is introduced into the treating chamber downstream in the line, in which it is used for surface modification of an article under reduced pressure or normal pressure or overpressure.

The working conditions of the plasma generator in the first chamber are selected to excite the fluoro compound supplied. The working conditions are selected to increase the decomposition rate of the fluoro compound, preferably to completely decompose the fluoro compound.

The excited fluoro compound-containing gas is transported from the first chamber to the second chamber via the gas channel. In the gas channel, the excited fluoro compound-containing gas is mixed with another gas to control the $F_2$ concentration to a level suitable for surface modification. The additional gas can be added from any one or more of the three inlets shown in the FIGURE. Alternatively, no additional gas may be added and a fluoro compound-containing gas containing a fluoro compound mixed with another gas may be provided in advance.

In the second chamber, surface modification takes place. The gas discharged from the second chamber is introduced into an exhaust gas treatment facility.

In the equipment of FIG. 1, the pressure is maintained at a level lower than atmospheric pressure (or normal pressure) upstream of the vacuum pump, then at atmospheric pressure downstream of the vacuum pump and upstream of the surface treating chamber, and then at reduced pressure or overpressure or atmospheric pressure in the surface treating chamber. However, the present invention is not limited to the embodiment of FIG. 1, but the pressure downstream of the vacuum pump may be raised by adding another gas. Preferred pressure conditions include 1-1333 Pa upstream of the vacuum pump and atmospheric pressure or more downstream of the vacuum pump.

INDUSTRIAL APPLICABILITY

According to the present invention, a large amount of hard-to-handle $F_2$ can be easily prepared in any concentration range when needed. Therefore, it is very useful for all industries using $F_2$. Especially, the present invention is useful for industries taking advantage of the reactivity of $F_2$ such as semiconductor manufacturing industry and pharmaceutical and agricultural chemical manufacturing industry as well as industries taking advantage of fluorinated materials prepared by reactions with $F_2$ such as polymer material manufacturing industry, inorganic material manufacturing industry, metal material manufacturing industry, organic material manufacturing industry and battery material manufacturing industry.

EXAMPLES

The following examples illustrate the present invention without, however, limiting the present invention thereto.

Example 1

$F_2$ was prepared from a fluoro compound-containing gas using the equipment of FIG. 1. $NF_3$ was used as the fluoro compound gas, and an inductively coupled plasma (ICP) generator (Litmas Blue 1200 from Landmark Technology) was used as the plasma generator.

First, the first chamber including the plasma generator was evacuated to 1 Torr (133 Pa). Then, $NF_3$ (flow rate: 200 sccm) was diluted with Ar (flow rate: 300 sccm) at diluting gas inlet 1 to prepare a fluoro compound-containing gas, and the fluoro compound-containing gas was supplied to the first chamber. A power of 1200 W was applied to the plasma generator. The fluoro compound-containing gas discharged from the first chamber was diluted again with nitrogen (flow rate: 9300 sccm) at diluting gas inlet 3 and transported to the treating chamber (second chamber) maintained under normal pressure downstream of the vacuum pump.

Theoretically, if $NF_3$ supplied at the $NF_3$ flow rate of the present example is completely decomposed ($NF_3 \rightarrow \tfrac{1}{2}N_2 + 3/2F_2$), $N_2$ and $F_2$ will be generated at 100 sccm and 300 sccm, respectively. Thus, if $NF_3$ is completely decomposed, the $F_2$ concentration after dilution with nitrogen will be 3.0 vol %.

The fluoro compound-containing gas was sampled between the vacuum pump and the second chamber and analyzed by FT-IR and titrated with a 10% KI aqueous solution. The FT-IR analyzer used was FT-IR IGA-2000 from Midac. As a result, the concentration of $F_2$ in the fluoro compound-containing gas was 2.9 vol %, showing that the decomposition rate of $NF_3$ supplied to the first chamber was 98%.

Then, surface treatment of polypropylene plates was performed in the second chamber. The second chamber used was a cylindrical vessel made from Ni having an inner volume of 4.6 L. Five polypropylene plates (hereinafter sometimes abbreviated as PP; L×W×H=20 mm×20 mm×2 mm) were placed in this vessel and the atmosphere in the second chamber was replaced by nitrogen gas. Then, the fluoro compound-containing gas obtained by the operation above was transported into the second chamber and surface treatment of PP was performed at 25° C. for a predetermined period. The contact angles on PP surfaces (contact angles of water expressed in degrees) were measured at various treating times (the contact angle on PP before treatment: 89 degrees). The measurement results are shown in Table 1 (the calculated average of five PPs (n=5)).

Example 2

An experiment similar to Example 1 was performed except that the flow rate of nitrogen for diluting the fluoro compound-containing gas discharged from the first chamber including the plasma generator was changed to 5300 sccm. If $NF_3$ is completely decomposed under these conditions, the concentration of $F_2$ in the fluoro compound-containing gas transported to the second chamber maintained under normal pressure downstream of the vacuum pump will be 5.0 vol %.

The concentration of $F_2$ in a sampled fluoro compound-containing gas was 4.9 vol %, showing that the decomposition rate of $NF_3$ was 98%.

Then, surface treatment of PP was performed in the same manner as in Example 1 and the contact angles were measured. The measurement results are shown in Table 1.

TABLE 1

| Contact angles on surfaces (in degrees) | | | | | |
|---|---|---|---|---|---|
| | Treating time | | | | |
| Example | 1 min | 5 min | 10 min | 30 min | 60 min |
| 1 | 89 | 89 | 101 | 104 | 105 |
| 2 | 94 | 102 | 103 | 105 | 105 |

Example 3

An experiment similar to Example 1 was performed except that $C_2F_6$ was used in place of $NF_3$ as the fluoro compound, a fluoro compound-containing gas was generated by diluting $C_2F_6$ (flow rate: 40 sccm) with $O_2$ (flow rate: 160 sccm) and supplied to the first chamber including the plasma generator and the fluoro compound-containing gas discharged from the first chamber was diluted with nitrogen at a flow rate of 100 slm.

In a sampled fluoro compound-containing gas, 710 ppm $F_2$ gas was detected, and the decomposition rate of $C_2F_6$ supplied was approximately 100%.

Then, surface treatment was performed in the same manner as in Example 1 except that the fluoro compound-containing gas diluted with nitrogen as described above was used and aluminum plates were used in place of the polypropylene plates. Five aluminum plates (hereinafter sometimes abbreviated as Al; L×W×H=20 mm×20 mm×2 mm) were placed in a cylindrical vessel made from Ni having an inner volume of 4.6 L (second chamber) and the atmosphere in the second chamber was replaced by nitrogen gas. Then, the fluoro compound-containing gas obtained by the operation above was transported into the second chamber and surface treatment of Al was performed at 25° C. for a predetermined period, and the contact angles on Al surfaces (contact angles of water expressed in degrees) were measured at various treating times.

The measurement results are shown in Table 2.

Example 4

An experiment similar to Example 3 was performed except that FCOF was used in place of $C_2F_6$ as the fluoro compound.

In a sampled fluoro compound-containing gas, 140 ppm $F_2$ gas was detected, and the decomposition rate of FCOF supplied was 69%.

Then, surface treatment of copper plates (sometimes abbreviated as Cu) in place of Al was performed and the contact angles were measured in the same manner as in Example 3. In this case, Cu was preliminarily acid-washed (Cu was stirred in a 0.1N HCl solution for 30 min and then washed with water three times) and heated (heated in the atmosphere at 200° C. for 1 hr and then allowed to cool in a desiccator). The measurement results are shown in Table 2.

TABLE 2

| Contact angles on surfaces (in degrees) | | | | | |
|---|---|---|---|---|---|
| | Treating time | | | | |
| Example | 10 min | 30 min | 60 min | 120 min | 180 min |
| 3 | 93 | 105 | 109 | 108 | 109 |
| 4 | 94 | 102 | 109 | 109 | 108 |

Example 5

Using the equipment of FIG. 1, surface modification of polypropylene was performed. $NF_3$ was used as the fluoro compound gas, and an inductively coupled plasma (ICP) generator (Litmas Blue 1200 from Landmark Technology) was used as the plasma generator. A polypropylene (PP) sample of L×W×H=20 mm×20 mm×2 mm was placed in the second chamber.

First, the first chamber was evacuated to 1 Torr. Then, $NF_3$ (flow rate: 100 sccm) was diluted with Ar (flow rate: 400 sccm) at inlet 1 to prepare a fluoro compound-containing gas, and the fluoro compound-containing gas was supplied to the first chamber. A power of 1200 W was applied to the plasma generator. The fluoro compound-containing gas discharged from the first chamber was diluted again with nitrogen (flow rate: 14400 sccm) at inlet 3 and introduced into the second chamber maintained under normal pressure. If $NF_3$ is completely decomposed under these conditions, the concentration of $F_2$ in the fluoro compound-containing gas introduced into the second chamber will be 1 vol % (the results of sample analyses showed that the $F_2$ concentration was 0.99 vol % and the decomposition rate was 99%).

In the second chamber, the PP sample was contacted with the fluoro compound-containing gas under normal pressure at 24° C. for 3 hrs.

The sample surface was analyzed by XPS PHI Quantum 2000 from ULVAC-PHI. Before treatment, the atomic concentration of carbon on the sample surface was 83 atom % and the atomic concentration of fluorine was 0 atom %, but after treatment, the atomic concentration of carbon was 49 atom % and the atomic concentration of fluorine was 44 atom %. The results of this analysis by XPS show that the sample surface has been fluorinated.

Conditions of analysis by XPS are as follows.
X-ray source: Al Kα 1486.6 eV monochromatic
X-ray output: 24.72 W
X-ray beam diameter: 100.0 mm
Source to analyzer angle: 45.0°
Neutralizer energy: 1.0 V
Neutralizer current: 25.0 nA
In-depth analyses
Sputter ion: $Ar^+$
Sputter energy: 3.000 keV
Sputter current: 25.0 nA.

Example 6

Surface modification of a PP sample was performed in the same manner as in Example 5 except that $NF_3$ (flow rate: 200 sccm) was diluted with Ar (flow rate: 300 sccm) to prepare a fluoro compound-containing gas and the fluoro compound-containing gas discharged from the first chamber was diluted with nitrogen at a flow rate of 9300 sccm. If NF$_3$ is completely decomposed, the concentration of F$_2$ in the fluoro compound-containing gas introduced into the second chamber will be 3 vol % (the results of sample analyses showed that the F$_2$ concentration was 2.9 vol % and the decomposition rate was 99%).

After surface treatment, the surface of the PP sample was analyzed by XPS PHI Quantum 2000 from ULVAC-PHI in the same manner as in Example 5. Before treatment, the atomic concentration of carbon on the sample surface was 83 atom % and the atomic concentration of fluorine was 0 atom %, but after treatment, the atomic concentration of carbon was 41 atom % and the atomic concentration of fluorine was 53 atom %. These results show that the sample surface has been fluorinated.

Example 7

Using the equipment of FIG. 1, an etching test was performed on a wafer with SiO$_2$ film. A wafer (25 mm×25 mm) having an SiO$_2$ film (7500 angstroms) on single-crystal Si was placed in a cylindrical vessel made from Ni having an inner volume of 4.6 L (second chamber). Upstream of this second chamber, an inductively coupled plasma (ICP) generator (ASTRONi from ASTeX) was provided as the plasma generator (first chamber). The atmosphere in the first and second chambers was replaced by nitrogen. Then, the second chamber was evacuated to 0.5×10$^5$ Pa, and heated to predetermined temperatures (260° C. and 310° C.). NF$_3$ (1000 sccm) was supplied into the first chamber and decomposed, and the fluoro compound-containing gas discharged from the first chamber was diluted with nitrogen (flow rate: 5500 sccm) at diluting gas inlet 3. The pressure near diluting gas inlet 3 was normal pressure. Thus, a fluoro compound-containing gas containing F$_2$ at a concentration of 20 vol % was generated. Of this fluoro compound-containing gas, 1000 sccm was transported into the second chamber maintained at 0.5×10$^5$ Pa and each predetermined temperature, and the target wafer was surface treated at each temperature.

After treatment, the wafer was measured for film thickness using Nano Spec 3000AF-T from Nanometrics to determine the etching rate at each predetermined temperature. The results are shown in Table 3.

TABLE 3

| Etching rate of SiO$_2$ film (in angstroms/min) | |
| --- | --- |
| Treating temperature | Etching rate |
| 260° C. | 60 |
| 310° C. | 280 |

Example 8

Using the surface treatment equipment of FIG. 1, compounds were fluorinated.

In the surface treatment equipment of FIG. 1, a 1000 ml PFA reactor including a temperature-controlled bath was placed at the position of the treating chamber. In the reactor, 517 g (5.87 mol) of 1,3-dioxolan-2-one was introduced and molten in the temperature-controlled bath at 50° C. Then, dissolved gas components such as air were expelled from the system with a nitrogen gas stream at a flow rate of 200 sccm fed into the reactor for 30 min so that the atmosphere in the system was replaced by nitrogen. Then, F$_2$ was generated from NF$_3$ using NF$_3$ as the fluoro compound-containing gas and an inductively coupled plasma (ICP) generator (ASTRONi from ASTeX) as the plasma generator. NF$_3$ (1000 sccm) was introduced and diluted with N$_2$ (3000 sccm) to give approximately 30% of F$_2$. The pressure near diluting N$_2$ gas inlet 3 was normal pressure. Of the 30% F$_2$, 350 sccm was introduced into the reactor using a gas nozzle fitted with an SUS filter (pore diameter 15 μm, surface area 7.5 cm$^2$). The reaction solution was constantly stirred by a stirrer at about 800 rpm to prevent fluorine gas from locally staying. The liquid phase temperature in the reactor was maintained at 50-60° C. by an outer temperature-controlled bath. Simultaneously, the gas phase temperature was maintained at 35-50° C. by condensing/refluxing the vapor of the starting material, product and by-produced hydrogen fluoride with a condenser provided at the top of the reactor. Uncondensed gases such as unreacted fluorine was treated in a scrubber provided downstream of the condenser.

When the amount of fluorine introduced reached 10.6 mol (1.8 mol equivalents of the starting material), the reaction was terminated and the by-produced hydrogen fluoride was distilled off, and then the residue was washed with water (200 ml) and a 10% NaHCO$_3$ aqueous solution (100 ml), extracted with dichloromethane (6×500 ml). The extract was dried over anhydrous magnesium sulfate, and then dichloromethane was distilled off. The resulting crude product (590 g) was purified by distillation to give 480 g of 4-fluoro-1,3-dioxolan-2-one at a purity of 90% or more (yield about 70%).

The crude product at a purity of 90% was recrystallized at 15° C. three times to give about 390 g of 4-fluoro-1,3-dioxolan-2-one at a purity of 99% or more.

Comparative Example 1

In the equipment of FIG. 1, a decomposition experiment of a fluoro compound (NF$_3$) was performed to prepare a fluoro compound-containing gas in the same manner as in Example 1 except that the first chamber of the plasma generator and the second chamber of the treating chamber were connected without using the vacuum pump unlike Example 1 and the pressure in the treating chamber was maintained at 1.0 Torr similarly to the pressure in the plasma generator rather than normal pressure.

In this case, the concentration of F$_2$ in a sampled fluoro compound-containing gas was 114 ppm.

Comparative Example 2

In the equipment of FIG. 1, a decomposition experiment of a fluoro compound (NF$_3$) was performed to prepare a fluoro compound-containing gas in the same manner as in Example 1 except that the plasma generator and the treating chamber were connected without using the vacuum pump unlike Example 1 and the fluoro compound (NF$_3$) was ionized at 1.0 Torr and the pressure in the treating chamber was adjusted to 0.48 Torr rather than normal pressure.

In this case, the concentration of F$_2$ in a sampled fluoro compound-containing gas was 84 ppm.

In addition to the embodiments explained above, the present invention includes the following embodiments.

[A] A surface modification process comprising the steps of:

(1) exciting at least one fluoro compound in a fluoro compound-containing gas by conferring energy on the fluoro compound-containing gas in a first zone maintained under reduced pressure;

(2) transporting the excited fluoro compound-containing gas containing the excited fluoro compound to a second zone communicating with the first zone and maintained under normal pressure or overpressure; and (3) contacting an $F_2$-containing gas containing $F_2$ gas generated by partial or complete conversion of the excited fluoro compound with the surface of an article in the second zone to modify the surface of the article;

(4) wherein the converted $F_2$ gas is used before the fluoro compound excited in the first zone is partially or wholly contacted with the surface of the article in the second zone.

[B] A surface modification process comprising the steps of:

(1) exciting at least one fluoro compound in a fluoro compound-containing gas by conferring energy on the fluoro compound-containing gas under a reduced pressure condition in a first zone;

(2) maintaining the pressure in the transportation system under a normal pressure or overpressure condition during transportation of the excited fluoro compound-containing gas containing the excited fluoro compound to a second zone communicating with the first zone; and (3) contacting an $F_2$-containing gas containing $F_2$ gas generated by partial or complete conversion of the excited fluoro compound with the surface of an article in the second zone to modify the surface of the article;

(4) wherein the converted $F_2$ gas is used before the fluoro compound excited in the first zone is partially or wholly contacted with the surface of the article in the second zone.

[C] A surface modification process comprising the steps of:

(1) exciting at least one fluoro compound in a fluoro compound-containing gas by conferring energy on the fluoro compound-containing gas under a reduced pressure condition in a first zone;

(2) partially or completely converting the excited fluoro compound into an $F_2$-containing gas containing $F_2$ by maintaining the pressure in the first zone under a normal pressure or overpressure condition;

(3) transporting the converted $F_2$-containing gas to a second zone communicating with the first zone; and (4) contacting the $F_2$-containing gas containing $F_2$ gas generated by partial or complete conversion of the excited fluoro compound with the surface of an article in the second zone to modify the surface of the article;

(5) wherein the converted $F_2$ gas is used before the fluoro compound excited in the first zone is partially or wholly contacted with the surface of the article in the second zone.

[D] A surface modification process comprising the steps of:

(1) exciting at least one fluoro compound in a fluoro compound-containing gas by conferring energy on the fluoro compound-containing gas in a first chamber maintained under reduced pressure;

(2) transporting the excited fluoro compound-containing gas containing the excited fluoro compound from the first chamber to a second chamber maintained under normal pressure or overpressure via a gas channel connecting the first chamber and the second chamber; and (3) contacting an $F_2$-containing gas containing $F_2$ gas generated by partial or complete conversion of the excited fluoro compound with the surface of an article in the second chamber to modify the surface of the article;

(4) wherein the converted $F_2$ gas is used before the fluoro compound excited in the first chamber is partially or wholly contacted with the surface of the article in the second chamber.

[E] A surface modification process comprising the steps of:

(1) exciting at least one fluoro compound in a fluoro compound-containing gas by conferring energy on the fluoro compound-containing gas under a reduced pressure condition in a first chamber;

(2) maintaining the pressure in the transportation system under a normal pressure or overpressure condition during transportation of the excited fluoro compound-containing gas containing the excited fluoro compound from the first chamber to a second chamber via a gas channel connecting the first chamber and the second chamber; and (3) contacting an $F_2$-containing gas containing $F_2$ gas generated by partial or complete conversion of the excited fluoro compound with the surface of an article in the second chamber to modify the surface of the article;

(4) wherein the converted $F_2$ gas is used before the fluoro compound excited in the first chamber is partially or wholly contacted with the surface of the article in the second chamber.

[F] A surface modification process comprising the steps of:

(1) exciting at least one fluoro compound in a fluoro compound-containing gas by conferring energy on the fluoro compound-containing gas under a reduced pressure condition in a first chamber;

(2) partially or completely converting the excited fluoro compound into an $F_2$-containing gas containing $F_2$ gas generated by such conversion by maintaining the pressure in the first chamber under a normal pressure or overpressure condition;

(3) transporting the converted $F_2$-containing gas from the first chamber to a second chamber via a gas channel connecting the first chamber and the second chamber; and (4) contacting the $F_2$-containing gas containing $F_2$ gas generated by partial or complete conversion of the excited fluoro compound with the surface of an article in the second chamber to modify the surface of the article;

(5) wherein the converted $F_2$ gas is used before the fluoro compound excited in the first chamber is partially or wholly contacted with the surface of the article in the second chamber.

[G] The surface modification process of [D] or [E] wherein a vacuum pump is provided in the gas channel connecting the first chamber and the second chamber and said vacuum pump is used during the step of transporting the excited fluoro compound-containing gas from the first chamber to the second chamber.

[H] The surface modification process of any one of [A]-[G] further comprising the step of introducing an inert gas and/or oxygen after conferring energy on the fluoro compound-containing gas before contacting the gas with the article to be surface-modified.

[I] The surface modification process of any one of [A]-[H] wherein the energy conferring step comprises ionizing the fluoro compound-containing gas.

[J] The surface modification process of any one of [A]-[I] wherein the fluoro compound is a gaseous fluoro compound selected from linear, branched or cyclic saturated perfluorocarbons, linear, branched or cyclic unsaturated perfluorocarbons, carbonyl fluorides, perfluoro hypofluorides, perfluoro peroxides, perfluoroether compounds, oxygen-containing fluorides, interhalogen fluorides, iodine-containing fluorides, sulfur-containing fluorides, nitrogen-containing fluorides, silicon-containing fluorides, rare gas-containing fluorides, or combinations thereof.

[K] The surface modification process of any one of [A]-[I] wherein the fluoro compound is selected from $CF_4$, $C_2F_6$, $C_3F_8$, $C_4F_{10}$, $C_5F_{12}$, $C_6F_{14}$, $C_2F_4$, $C_3F_6$, $C_4F_8$, $C_5F_{10}$, $C_6F_{12}$, $C_4F_6$, FCOF, $CF_3COF$, $CF_2(COF)_2$, $C_3F_7COF$, $CF_3OF$, $C_2F_5OF$, $CF_2(OF)_2$, $CF_3COOF$, $CF_3OOCF_3$, $CF_3COOOF$, $CF_3OCF_3$, $C_2F_5OC_2F_5$, $C_2F_4OC_2F_4$, $OF_2$, $SOF_2$, $SOF_4$, $NOF$, $ClF_3$, $IF_5$, $BrF_5$, $BrF_3$, $CF_3I$, $C_2F_5I$, $N_2F_4$, $NF_3$, $NOF_3$, $SiF_4$, $Si_2F_6$, $XeF_2$, $XeF_4$, $KrF_2$, $SF_4$, $SF_6$, or a mixture thereof.

[L] The surface modification process of any one of [A]-[K] wherein the fluoro compound-containing gas comprises an inert gas and/or oxygen.

[M] The surface modification process of [L] wherein the inert gas is He, Ne, Ar, Xe, Kr, $N_2$, or a combination thereof.

[N] The surface modification process of any one of [A]-[M] wherein the fluoro compound is one or more members selected from the group consisting of $NF_3$, $C_2F_6$, and $COF_2$.

[O] The surface modification process of [N] wherein the fluoro compound is ionized in the presence of oxygen when it is a perfluorocarbon or a mixture containing one or more perfluorocarbons.

[P] The surface modification process of any one of [A]-[O] wherein the surface modification is performed by fluorinating the surface of the article.

[Q] The surface modification process of any one of [A]-[P] wherein the article to be surface-modified is a metal and/or metal compound and/or polymer.

[R] The surface modification process of [Q] wherein the polymer is an article based on polypropylene.

[S] The surface modification process of [Q] wherein the metal compound is one or more members selected from the group consisting of metal oxides, metal nitrides, metal carbides, metal hydroxides and metal chlorides.

[T] The surface modification process of [Q] wherein the metal compound is a compound based on Si, especially Si, $SiO_2$, $Si_3N_4$, SiC, polysilicon, amorphous silicon, or a combination thereof.

[U] The surface modification process of [T] wherein the compound based on Si is deposited in an LPCVD equipment.

[V] A surface modification equipment comprising:
a first zone including a means for ionizing a fluoro compound-containing gas under reduced pressure, and
a second zone communicating with the first zone and including an article to be surface-modified therein and a means for contacting a fluorine-containing gas generated by controlling the pressure under normal pressure or overpressure with the surface of the article under reduced pressure or overpressure to modify the surface of the article.

[W] A surface modification equipment comprising:
a first chamber including a means for ionizing a fluoro compound-containing gas under reduced pressure, and
a second chamber communicating with the first chamber and including an article to be surface-modified therein and a means for contacting a fluorine-containing gas generated by controlling the pressure under normal pressure or overpressure with the surface of the article under reduced pressure or overpressure to modify the surface of the article.

[X] The surface modification equipment of [W] wherein a vacuum pump or compressor is provided before and/or after the second chamber.

[Y] The surface modification equipment of [X] wherein the first chamber, second chamber, and vacuum pump are successively connected and the first chamber and second chamber are independently connected with the vacuum pump or the surface modification equipment of [X] wherein the first chamber, compressor, and second chamber are successively connected and the first chamber and compressor are independently connected with the second chamber.

[Z] A method for using the equipment of [V]-[Y] to directly fluorinate an organic and/or inorganic material.

The invention claimed is:

1. A process for preparing an $F_2$-containing gas comprising:
    exciting at least one fluoro compound in a fluoro compound-containing gas by conferring energy on the fluoro compound-containing gas under reduced pressure; and
    partially or completely converting the excited fluoro compound-containing gas containing the excited fluoro compound into $F_2$ under atmospheric pressure or a pressure that is over atmospheric pressure.

2. The process for preparing an $F_2$-containing gas of claim 1, wherein the exciting of a fluoro compound is performed in a first zone maintained under reduced pressure; and
    the converting of the excited fluoro compound-containing gas into $F_2$ is performed in a second zone communicating with the first zone and maintained under atmospheric pressure or a pressure that is over atmospheric pressure.

3. The process for preparing an $F_2$-containing gas of claim 1 wherein the exciting of a fluoro compound is performed in a first zone maintained under reduced pressure; and
    during transportation of the excited fluoro compound-containing gas to a second zone communicating with the first zone via a transportation system, the converting of the excited fluoro compound-containing gas into $F_2$ comprises maintaining the pressure in the transportation system at atmospheric pressure or a pressure that is over atmospheric pressure.

4. The process for preparing an $F_2$-containing gas of claim 1, wherein the exciting of a fluoro compound is performed in a first zone maintained under reduced pressure; and
    the converting of the excited fluoro compound-containing gas into $F_2$ is performed by maintaining the pressure in the first zone at atmospheric pressure or a pressure that is over atmospheric pressure.

5. The process for preparing an $F_2$-containing gas of claim 1, wherein the exciting of a fluoro compound is performed in a first chamber maintained under reduced pressure; and
    the converting of the excited fluoro compound-containing gas into $F_2$ comprises transporting the excited fluoro compound-containing gas containing the excited fluoro compound from the first chamber to a second chamber maintained under atmospheric pressure or a pressure that is over atmospheric pressure via a gas channel connecting the first chamber and the second chamber.

6. The process for preparing an $F_2$-containing gas of claim 5, wherein a vacuum pump is provided in a gas channel connecting the first chamber and the second chamber and said vacuum pump is used during the transporting of the excited fluoro compound-containing gas from the first chamber to the second chamber.

7. The process for preparing an $F_2$-containing gas of claim 1, wherein the exciting of a fluoro compound is performed in a first chamber maintained under reduced pressure; and
    the converting of the excited fluoro compound-containing gas into $F_2$ comprises maintaining the pressure in a transportation system at atmospheric pressure or a pressure that is over atmospheric pressure during transportation of the excited fluoro compound-containing gas containing the excited fluoro compound from the first chamber to a second chamber via a gas channel connecting the first chamber and the second chamber.

8. The process for preparing an $F_2$-containing gas of claim 7, wherein a vacuum pump is provided in a gas channel connecting the first chamber and the second chamber and said vacuum pump is used during transporting of the excited fluoro compound-containing gas from the first chamber to the second chamber.

9. The process for preparing an $F_2$-containing gas of claim 1, wherein the exciting of a fluoro compound is performed in a first chamber maintained under reduced pressure; and the converting of the excited fluoro compound-containing gas into $F_2$ is performed in the first chamber by maintaining the first chamber under atmospheric pressure or a pressure that is over atmospheric pressure.

10. The process for preparing an $F_2$-containing gas of claim 1, wherein the exciting of a fluoro compound comprises generating a plasma state of the fluoro compound-containing gas.

11. The process for preparing an $F_2$-containing gas of claim 1, wherein the fluoro compound is a gaseous fluoro compound selected from the group consisting of linear, branched or cyclic saturated perfluorocarbons, linear, branched or cyclic unsaturated perfluorocarbons, carbonyl fluorides, perfluoro hypofluorides, perfluoro peroxides, perfluoroether compounds, oxygen-containing fluorides, interhalogen fluorides, iodine-containing fluorides, sulfur-containing fluorides, nitrogen-containing fluorides, silicon-containing fluorides, rare gas-containing fluorides, and combinations thereof.

12. The process for preparing an $F_2$-containing gas of claim 1, wherein the fluoro compound is selected from the group consisting of $CF_4$, $C_2F_6$, $C_3F_8$, $C_4F_{10}$, $C_5F_{12}$, $C_6F_{14}$, $C_2F_4$, $C_3F_6$, $C_4F_8$, $C_5F_{10}$, $C_6F_{12}$, $C_4F_6$, FCOF, $CF_3COF$, $CF_2(COF)_2$, $C_3F_7COF$, $CF_3OF$, $C_2F_5OF$, $CF_2(OF)_2$, $CF_3COOF$, $CF_3OOCF_3$, $CF_3COOOF$, $CF_3OCF_3$, $C_2F_5OC_2F_5$, $C_2F_4OC_2F_4$, $OF_2$, $SOF_2$, $SOF_4$, NOF, $ClF_3$, $IF_5$, $BrF_5$, $BrF_3$, $CF_3I$, $C_2F_5I$, $N_2F_4$, $NF_3$, $NOF_3$, $SiF_4$, $Si_2F_6$, $XeF_2$, $XeF_4$, $KrF_2$, $SF_4$, $SF_6$, and a mixture thereof.

13. The process for preparing an $F_2$-containing gas of claim 1, wherein the fluoro compound-containing gas comprises an inert gas and/or oxygen.

14. The process for preparing an $F_2$-containing gas of claim 1, wherein the fluoro compound-containing gas comprises an inert gas and/or oxygen, and wherein said inert gas is selected from the group consisting of He, Ne, Ar, Xe, Kr, $N_2$, and a combination thereof.

15. The process for preparing an $F_2$-containing gas of claim 1, wherein the fluoro compound is one or more members selected from the group consisting of $NF_3$, $C_2F_6$, and FCOF.

16. The process for preparing an $F_2$-containing gas of claim 15, wherein generation of a plasma state of the fluoro compound is conducted in the presence of oxygen when the fluoro compound is a perfluorocarbon or a mixture containing one or more perfluorocarbons.

17. A process for modifying a surface of an article comprising contacting an $F_2$-containing gas with the surface of the article under reduced pressure or a pressure that is over atmospheric pressure or atmospheric pressure, wherein said $F_2$-containing gas is obtained by a process comprising:

exciting at least one fluoro compound in a fluoro compound-containing gas by conferring energy on the fluoro compound-containing gas under reduced pressure; and partially or completely converting the excited fluoro compound-containing gas containing the excited fluoro compound into $F_2$ under atmospheric pressure or a pressure that is over atmospheric pressure.

18. The surface modification process of claim 17, further comprising introducing an inert gas and/or oxygen after conferring energy on the fluoro compound-containing gas before contacting the $F_2$-containing gas with the article to be surface-modified.

19. The surface modification process of claim 17, wherein the surface modification is performed by fluorinating the surface of the article.

20. The surface modification process of claim 17, wherein the article to be surface-modified is one or more members selected from the group consisting of metals, metal compounds and polymers.

21. The surface modification process of claim 20, wherein the polymer is an article based on polypropylene.

22. The surface modification process of claim 20, wherein the metal compound is one or more members selected from the group consisting of metal oxides, metal nitrides, metal carbides, metal hydroxides and metal chlorides.

23. The surface modification process of claim 20, wherein the metal compound is a compound based on Si.

24. The surface modification process of claim 23, wherein the compound based on Si is Si, $SiO_2$, $Si_3N_4$, SiC, polysilicon, amorphous silicon, or a combination thereof.

25. The surface modification process of claim 23, wherein the compound based on Si is deposited in an LPCVD equipment.

26. A process for modifying a surface of an article comprising contacting an $F_2$-containing gas with the surface of the article under reduced pressure or a pressure that is over atmospheric pressure or atmospheric pressure, wherein said $F_2$-containing gas is obtained by a process comprising:

exciting at least one fluoro compound in a fluoro compound-containing gas by conferring energy on the fluoro compound-containing gas under reduced pressure; and partially or completely converting the excited fluoro compound-containing gas containing the excited fluoro compound into $F_2$ under atmospheric pressure or a pressure that is over atmospheric pressure, wherein the exciting of a fluoro compound is performed in a first chamber maintained under reduced pressure; and the converting of the excited fluoro compound-containing gas into $F_2$ comprises transporting the excited fluoro compound-containing gas containing the excited fluoro compound from the first chamber to a second chamber maintained under atmospheric pressure or a pressure that is over atmospheric pressure via a gas channel connecting the first chamber and the second chamber.

\* \* \* \* \*